US012812242B2

(12) United States Patent
Takeuchi

(10) Patent No.: US 12,812,242 B2
(45) Date of Patent: Nov. 24, 2026

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Toshio Takeuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/205,244

(22) Filed: May 12, 2025

(65) Prior Publication Data

US 2025/0373936 A1 Dec. 4, 2025

(30) Foreign Application Priority Data

May 30, 2024 (JP) ................................ 2024-088272

(51) Int. Cl.
*H04N 23/66* (2023.01)
*H04N 23/68* (2023.01)
*H04N 23/695* (2023.01)

(52) U.S. Cl.
CPC ......... *H04N 23/66* (2023.01); *H04N 23/6812* (2023.01); *H04N 23/687* (2023.01); *H04N 23/695* (2023.01)

(58) Field of Classification Search
CPC .. H04N 23/66; H04N 23/6812; H04N 23/687; H04N 23/695
See application file for complete search history.

(56) References Cited

U.S. PATENT DOCUMENTS

| | | | | |
|---|---|---|---|---|
| 2012/0026349 A1* | 2/2012 | Ishii | ..................... | G02B 27/646 348/208.4 |
| 2019/0215540 A1* | 7/2019 | Nicol | ..................... | G06V 10/25 |
| 2020/0073541 A1* | 3/2020 | Matsubayashi | ..... | G06F 3/04847 |
| 2022/0232146 A1* | 7/2022 | Emori | .................. | H04N 23/631 |
| 2024/0080566 A1* | 3/2024 | Fiebig | .................... | H04N 5/268 |
| 2024/0334055 A1* | 10/2024 | Saito | .................... | H04N 23/667 |

FOREIGN PATENT DOCUMENTS

| | | |
|---|---|---|
| JP | 6753460 B2 | 9/2020 |
| WO | 2017154953 A1 | 9/2017 |

* cited by examiner

*Primary Examiner* — Sunghyoun Park
(74) *Attorney, Agent, or Firm* — Cowan, Liebowitz & Latman, P.C.

(57) ABSTRACT

There is provided with an information processing device. First camera work that is camera work by a camera in rehearsal image capturing and first sound information that is sound information in the rehearsal image capturing acquired. Second sound information that is sound information in live performance image capturing with respect to the rehearsal image capturing is acquired. Second camera work that is camera work of the camera in the live performance image capturing is determined based on the first camera work, the first sound information, and the second sound information. A control instruction to control the camera by the determined second camera work to a device that controls the camera is instructed.

12 Claims, 13 Drawing Sheets

FIG. 6

| CUT ID | | 1 | 2 | 3 | 4 | 5 |
|---|---|---|---|---|---|---|
| REHEARSAL CAMERAWORK INFORMATION | CAMERA ID | 1 | 2 | 1 | 3 | 2 |
| | START POSITION | P:30<br>T:40<br>Z:1 | P:−30<br>T:−20<br>Z:3 | P:40<br>T:10<br>Z:10 | P:30<br>T:40<br>Z:4 | P:30<br>T:40<br>Z:1 |
| | MOVEMENT SPEED (/sec) | P:5<br>T:1<br>Z:0.2 | P:4<br>T:2<br>Z:−0.2 | P:0<br>T:0<br>Z:−2 | P:5<br>T:2<br>Z:−0.5 | P:5<br>T:0<br>Z:0.2 |
| REHEARSAL SOUND INFORMATION | TEMPO (BPM) | 50 | 50 | 60 | 70 | 50 |
| | SOUND DATA | DO RE ME～♪ | FA SO LA～♪ | TI TO RE～♪ | ME FA SO～♪ | SO FA ME～♪ |

FIG. 8

| CUT ID | | 1 | 2 | 3 | 4 | 5 |
|---|---|---|---|---|---|---|
| LIVE PERFORMANCE SOUND INFORMATION | TEMPO PERFORMANCE (BPM) | 75 | – | | | |
| | SOUND DATA | DO RE ME～♪ | | | | |

FIG. 9

| CUT ID | | 1 | 2 | 3 | 4 | 5 |
|---|---|---|---|---|---|---|
| LIVE PERFORMANCE SOUND INFORMATION | TEMPO PERFORMANCE (BPM) | 75 | 100 (PROVISIONAL VALUES UP TO "SO" TONE) | | | |
| | SOUND DATA | DO RE ME～♪ | FA SO ～♪ | | | |

FIG. 13

| CUT ID | | 1 | 2 | 3 | 4 | 5 |
|---|---|---|---|---|---|---|
| REHEARSAL CAMERAWORK INFORMATION | CAMERA ID | 1 | 2 | 1 | 3 | 2 |
| | START POSITION | P:30<br>T:40<br>Z:1 | P:−30<br>T:−20<br>Z:3 | P:40<br>T:10<br>Z:10 | P:30<br>T:40<br>Z:4 | P:30<br>T:40<br>Z:1 |
| | MOVEMENT SPEED (/sec) | P:5<br>T:1<br>Z:0.2 | P:4<br>T:2<br>Z:−0.2 | P:0<br>T:0<br>Z:−2 | P:5<br>T:2<br>Z:−0.5 | P:5<br>T:0<br>Z:0.2 |
| | CAMERA OPERATION ROCKING WIDTH (50dB REFERENCE) | – | Z:±0.5 | P:±20<br>T:±10 | – | T:±10 |
| | ROCKING PERIOD (/sec) | – | 3 | 2 | – | 5 |
| REHEARSAL SOUND INFORMATION | TEMPO (BPM) | 50 | 50 | 60 | 70 | 50 |
| | SOUND DATA | DO RE ME～♪ | FA SO LA～♪ | TI TO RE～♪ | ME FA SO～♪ | SO FA ME～♪ |

FIG. 15

| CUT ID | | 1 | 2 | 3 | 4 | 5 |
|---|---|---|---|---|---|---|
| LIVE PERFORMANCE SOUND INFORMATION | TEMPO PERFORMANCE (BPM) | 75 | – | | | |
| | CHEERING MICROPHONE SOUND VOLUME PERFORMANCE | 75dB | | | | |
| | SOUND DATA | DO RE ME ～♪ | | | | |

FIG. 16

| CUT ID | | 1 | 2 | 3 | 4 | 5 |
|---|---|---|---|---|---|---|
| LIVE PERFORMANCE SOUND INFORMATION | TEMPO PERFORMANCE (BPM) | 75 | 100 (PROVISIONAL VALUES UP TO "SO" TONE) | | | |
| | CHEERING MICROPHONE SOUND PERFORMANCE | 75dB | 100dB | | | |
| | SOUND DATA | DO RE ME ～♪ | FA SO ～♪ | | | |

INFORMATION PROCESSING DEVICE, INFORMATION PROCESSING METHOD, AND STORAGE MEDIUM

BACKGROUND

Field of the Technology

The present disclosure relates to an information processing device, an information processing method, and a storage medium.

Description of the Related Art

There is conventionally known a method of determining camera work corresponding to a change in situation during livestreaming of music or the like. For example, Japanese Patent No. 6753460 proposes a method of switching the camera work, based on a music score information, when music performance reaches a specific position in the score.

SUMMARY

According to one embodiment of the present disclosure, an information processing device acquires first camera work that is camera work by a camera in rehearsal image capturing, acquires first sound information that is sound information in the rehearsal image capturing, acquires second sound information that is sound information in live performance image capturing with respect to the rehearsal image capturing, determines second camera work that is camera work of the camera in the live performance image capturing based on the first camera work, the first sound information, and the second sound information, and instructs a control instruction to control the camera by the determined second camera work to a device that controls the camera.

Features of the present disclosure will become apparent from the following description of embodiments with reference to the attached drawings. The following description of embodiments are described by way of example.

BRIEF DESCRIPTION OF THE DRAWINGS

FIG. 6 is a view showing an example of camera work and sound information in rehearsal image capturing;

FIG. 8 is a view showing an example of sound information (pattern 1) in live performance image capturing according to the first embodiment;

FIG. 9 is a view showing an example of sound information (pattern 2) in live performance image capturing according to the first embodiment;

FIG. 13 is a view showing an example of camera work and sound information in rehearsal image capturing;

FIG. 15 is a view showing an example of sound information (pattern 1) in live performance image capturing according to the second embodiment; and FIG. 16 is a view showing an example of sound information (pattern 2) in live performance image capturing according to the second embodiment.

DESCRIPTION OF THE EMBODIMENTS

Figure 1:
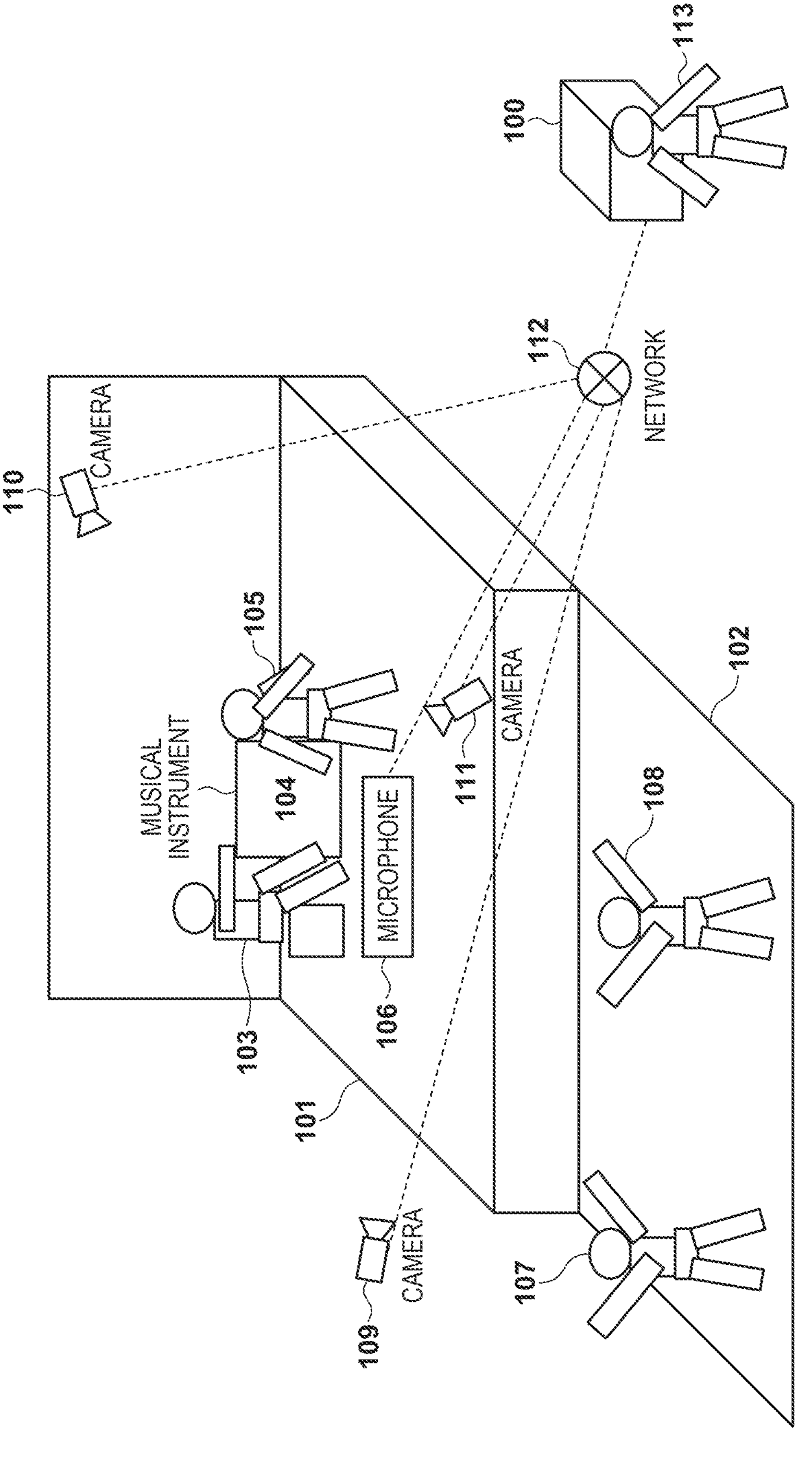
FIG. 1 is a schematic view of a system including an information processing device according to the first embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

In Japanese Patent No. 6753460 described above, determination is done based on arrival at a specific position in the score. For this reason, it was impossible to determine camera work that takes into consideration the tempo up to that position or the liveliness (cheering) of the place. More specifically, when filming a live musical performance or the like, the speed of the camerawork could not be adjusted in accordance with the tempo. Also, when filming a live musical performance, the camera is made to shake a little in accordance with the liveliness (sound volume of cheering) of the place. However, it was not possible to reflect the liveliness (sound volume of cheering) of the place cannot in the way in which the camera was made to shake.

It is an object of the present disclosure to appropriately control camera work based on a change in a live performance with respect to a rehearsal.

First Embodiment

An information processing device according to the first embodiment decides camera work in live performance image capturing based on camera work at the time of rehearsal image capturing, sound information at the time of rehearsal image capturing, and sound information at the time of live performance image capturing with respect to rehearsal image capturing. For example, assuming that image capturing at a live music performance is performed, the information processing device can decide the camera work at the time of live performance image capturing based on a tempo in rehearsal image capturing and a tempo in live performance image capturing.

FIG. 1 is a schematic view showing an example of the configuration of a control system including an information processing device according to this embodiment. An information processing device 100 is a device that performs processing of the control system. In the control system shown in FIG. 1, a stage 101, an auditorium 102, performers 103 and 105, a musical instrument 104, a microphone 106 that acquires a sound on the stage, audience persons 107 and 108, and cameras 109, 110, and 111 are illustrated. The information processing device 100 performs control of devices via a network 112. The network 112 may connect the information processing device 100 and other devices by wired communication or wireless communication. Also, a user 113 is a user who uses the information processing device 100 in the control system.

Note that in the example shown in FIG. 1, the control system includes a plurality of cameras, but only one camera may be included in the control system. In this case, in processing to be described later, the camera ID is always set to 1.

Figure 2:
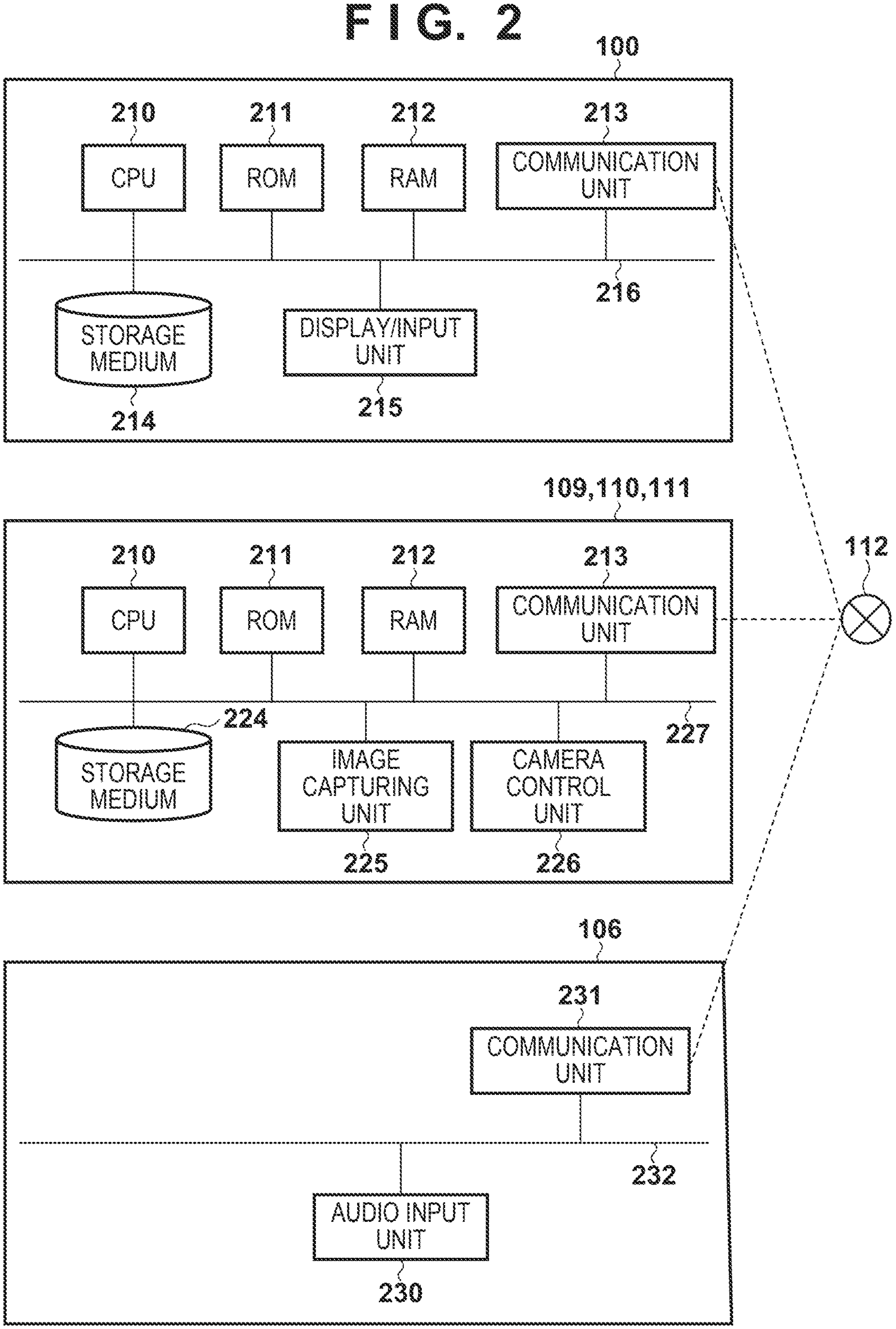
FIG. 2 is a block diagram showing an example of the hardware configurations of devices according to the first embodiment.

FIG. 2 is a block diagram showing an example of the hardware configurations of the information processing device 100, the cameras 109, 110, and 111, and the microphone 106 according to this embodiment. The information processing device 100 includes a CPU 210, a ROM 211, a RAM 212, a communication unit 213, a storage medium 214, and a display/input unit 215, and the constituent elements are connected by a bus 216.

The CPU 210 is a control unit formed by at least one processor or circuit and controls the entire information processing device 100. The ROM 211 is an electrically erasable/recordable memory and stores constants or programs for the operation of the CPU 210. A program according to this embodiment indicates a computer program configured to execute processing associated with various kinds of flowcharts to be described later. The RAM 212 deploys constants and variables for the operation of the CPU 210 or programs read out from the ROM 211. The communication unit 213 is an interface configured to communicate with an external device such as a network device or a USB device, and performs data communication via the network or data transmission/reception to/from an external device. The storage medium 214 is a recording medium such as a memory card, and is formed by a semiconductor memory. The display/input unit 215 is formed by buttons or a touch panel and a display device such a liquid crystal monitor, and accepts an operation input from the user and displays an operation result.

The cameras (109, 110, and 111) each include a CPU 220, a ROM 221, a RAM 222, a communication unit 223, a storage medium 224, an image capturing unit 225, and a camera control unit 226, and the constituent elements are connected by a bus 227. Here, the cameras 109, 110, and 111 are image capturing devices having the similar configuration and function, and a simple term "camera" indicates these without distinction hereinafter. However, the cameras may have different configurations if these can similarly be controlled.

The CPU 220 is a control unit formed by at least one processor or circuit and controls the entire camera. The ROM 221 is an electrically erasable/recordable memory and stores constants or programs for the operation of the CPU 220. The RAM 222 deploys constants and variables for the operation of the CPU 220 or programs read out from the ROM 221. The communication unit 223 is an interface configured to communicate with an external device such as a network device or a USB device, and performs data communication via the network or data transmission/reception to/from an external device. The storage medium 224 is a recording medium such as a memory card, and is formed by a semiconductor memory. The image capturing unit 225 is an image capturing element formed by a CCD or CMOS element that converts an optical image into an electrical signal. The camera control unit 226 performs control of pan, tilt, and zoom of the camera.

The microphone 106 includes an audio input unit 230, and a communication unit 231, and the constituent elements are connected by a bus 232. The audio input unit 230 is a device that converts a vibration sound from outside into sound data. The communication unit 231 is an interface configured to communicate with an external device such as a network device or a USB device, and performs data communication via the network or data transmission/reception to/from an external device.

Note that a description will be made here assuming that the information processing device 100, the cameras, and the microphone 106 are different devices. However, if the information processing device 100 can perform similar processing, the configuration of the control system is not limited to this. For example, the information processing device 100 may have some or all of the functions of the cameras and the microphone 106, or each camera may include the microphone 106 in the same device.

Figure 3:
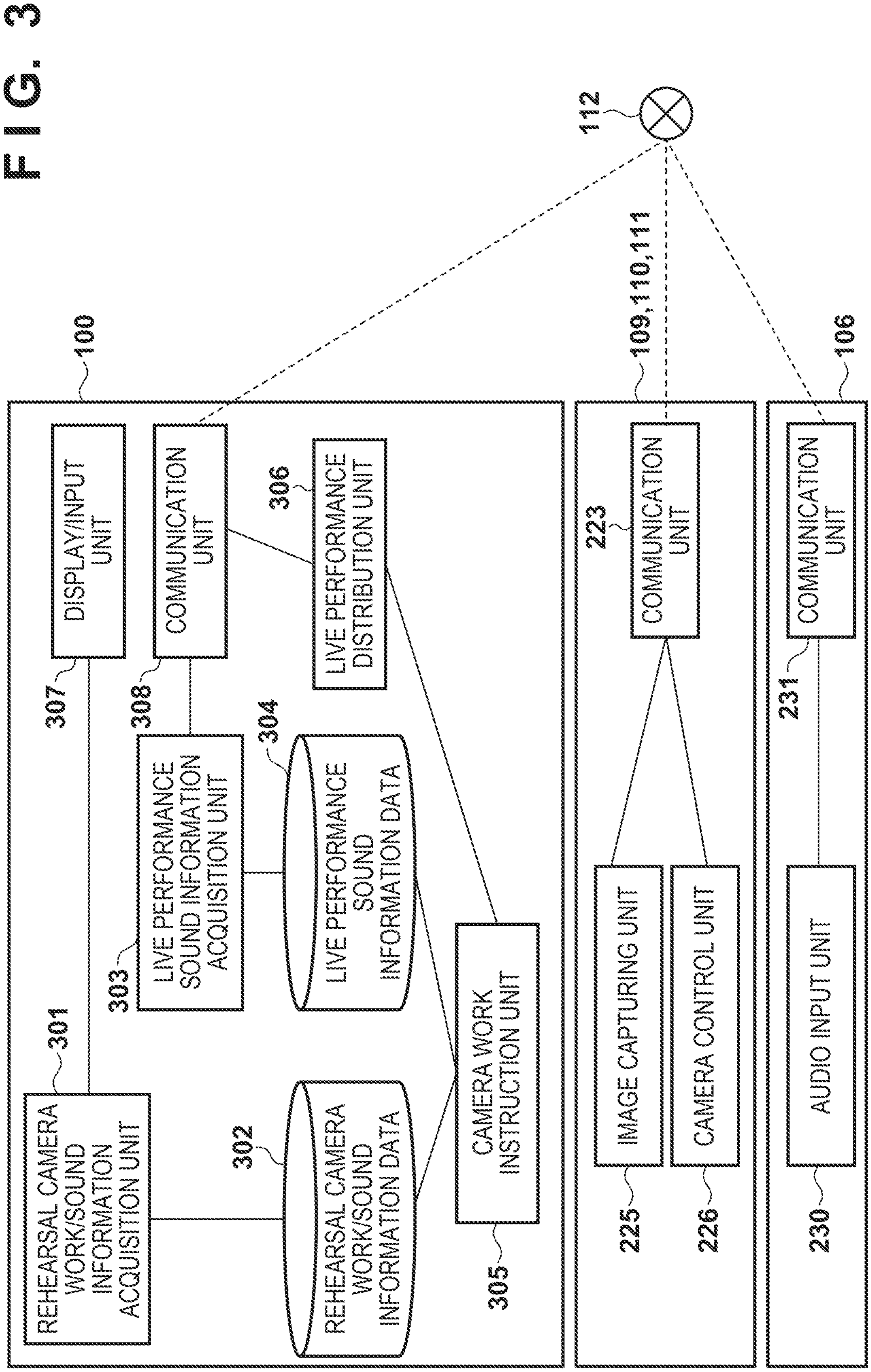
FIG. 3 is a block diagram showing an example of the functional configuration of the information processing device according to the first embodiment.

FIG. 3 is a block diagram showing an example of the functional configurations of the information processing device 100, the cameras 109, 110, and 111, and the microphone 106, which form the control system, and logical connection between these. Details of processing by each functional unit will be described later.

The information processing device 100 includes a rehearsal camera work/sound information acquisition unit (first acquisition unit) 301, a live performance sound information acquisition unit (second acquisition unit) 303, a camera work decision unit (decision unit) 305, a live performance video distribution unit (video distribution unit) 306, a display/input unit 307, and a communication unit 308. The first acquisition unit 301 acquires camera work in rehearsal image capturing and sound information in rehearsal image capturing as first information 302 indicating the camera work and the sound information in rehearsal image capturing. The second acquisition unit 303 acquires sound information in live performance as second information 304. The first acquisition unit 301 and the second acquisition unit 303 can acquire sound information acquired via the audio input unit 230 of the microphone 106.

The decision unit 305 decides camera work in live performance image capturing based on the camera work in rehearsal image capturing, sound information in rehearsal image capturing, and sound information in live performance image capturing. The camera work according to this embodiment includes control contents of pan/tilt/zoom (PTZ) of the cameras and information (camera ID) indicating a camera that should perform the control (and image capturing) at that timing.

The decision unit 305, for example, corrects camera work in a second audio section time-serially following a first audio section in rehearsal image capturing based on sound information in the first audio section (to be also referred to as "cut" hereinafter) in rehearsal image capturing and sound information in the first audio section in live performance image capturing, thereby deciding the camera work in the second audio section in live performance image capturing. Details of the processing performed by the decision unit 305 will be described later with reference to FIGS. 6 to 9.

The video distribution unit 306 acquires data captured by the image capturing unit 225 of the camera via the communication units 223 and 213 and distributes data acquired from the camera of the camera ID, which is the target of distribution at the current timing, via the communication unit 213.

The display/input unit 307 performs display of a processing result via the display/input unit 215 or acquisition of a user input. The communication unit 308 transmits/receives information to/from the outside via the communication unit 213.

Figure 4:
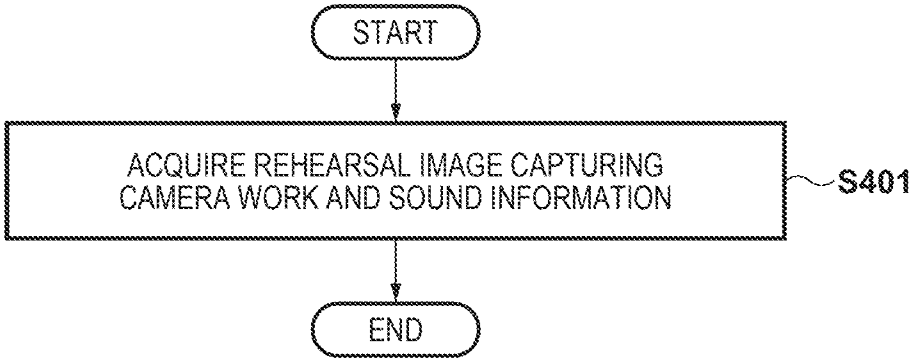
FIG. 4 is a flowchart showing an example of processing in rehearsal image capturing.

FIG. 4 is a flowchart showing an example of processing performed by the information processing device 100 according to this embodiment in rehearsal image capturing before live performance image capturing. Processing shown in FIG. 4 is started when, for example, the user instructs a start of processing.

In step S401, the first acquisition unit 301 acquires camera work and sound information in rehearsal image capturing and ends the processing shown in FIG. 4. The camera work and sound information (first information 302) acquired by the first acquisition unit 301 in this embodiment will be described below.

Figure 5:
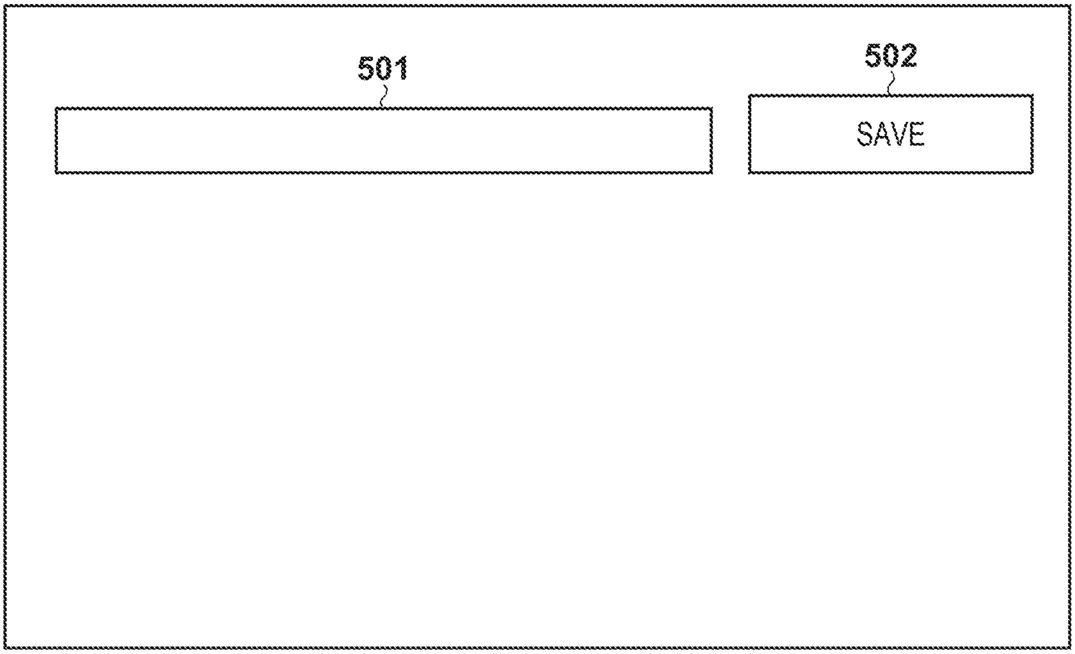
FIG. 5 is a view showing an example of a UI for acquiring a user input.

The first acquisition unit 301 can acquire the first information 302 based on, for example, a user input that is input via a screen as shown in FIG. 5. FIG. 5 will be described below. FIG. 5 shows a UI displayed on the screen and used by the user to input the first information. In this embodiment, the path of a file including the first information 302 is input to a frame 501, and then a save button 502 is pressed, the file whose path is input is saved in the information processing device 100.

FIG. 6 is a view showing an example of the first information 302 acquired by the first acquisition unit 301. The first information 302 includes a cut ID indicating a cut to perform image capturing, a camera ID corresponding to each cut ID, PTZ control contents, and sound information. The cut ID is information (here, time-serially) indicating a specific audio section (cut) during image capturing and is shown as an ID numbered for each timing of switching the camera work. Here, the PTZ control contents include a start position indicating a PTZ position of a camera at the start of a cut, and a movement speed indicating a change (a moving direction is indicated by a plus or negative sign and a movement amount is indicated by a numerical value) of PTZ of the camera from the start position per second. Here, "movement" of a camera is assumed to include movement of the position of the camera, a change of the posture of the camera, or a change of the zoom amount of the camera. Also, the sound information includes a tempo (BPM) that is the number of beats (the number of quarter notes) in one minute, and sound data that is data expressing a time-series change of the loudness and pitch of sound by a digital signal. In the table, sound data is expressed as CDE, . . . , for easy visualization. In other words, in the example shown in FIG. 6, a range of data expressing tones of CDE . . . as a digital signal is defined as cut ID (1). Similarly, the switching timing of each cut (the timing to shift to the section of the next cut ID) is defined as a position in the data expressing sound data as a digital signal.

Note that here, the section of one cut ID is a section set at the time of rehearsal image capturing, and is a predetermined section that can be defined by audio, for example, a section corresponding to one bar on a score or a section divided by recognizing a predetermined audio defined in advance. Note that the sections defined by the cut IDs may have the same length or different lengths.

Note that in FIG. 5, the description has been made assuming that the file designated on the screen is acquired as the first information 302. If it is possible to similarly acquire the camera work and sound information at the time of rehearsal image capturing, the acquisition method is not particularly limited to this. For example, the camera work included in the first information 302 may be acquired by acquiring operation contents of the camera in rehearsal image capturing. Alternatively, sound information included in the first information 302 may be generated from sound information acquired by the microphone 106 in rehearsal image capturing.

Figure 7:
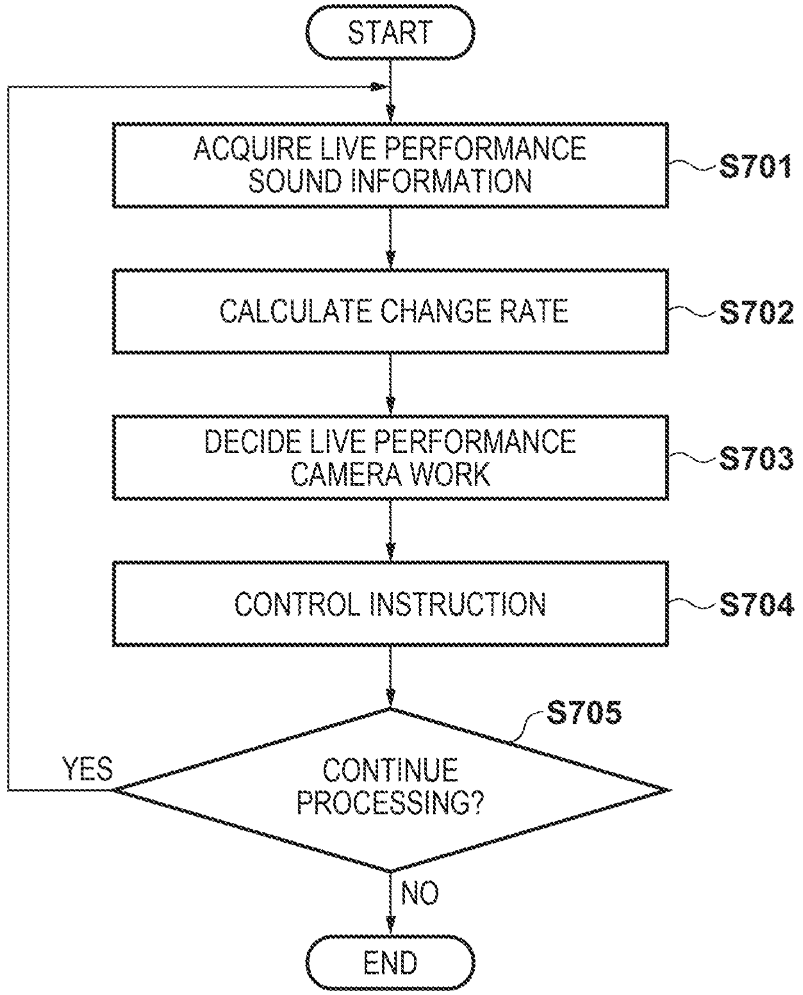
FIG. 7 is a flowchart showing an example of processing in live performance image capturing according to the first embodiment.

FIG. 7 is a flowchart showing an example of processing performed by the information processing device 100 according to this embodiment, which is performed in live performance image capturing after rehearsal image capturing. Processing shown in FIG. 7 is started when, for example, the user instructs a start of processing.

In step S701, the second acquisition unit 303 acquires sound information in live performance image capturing. Here, the second acquisition unit 303 can acquire sound information collected by the microphone 106 at the time of live performance image capturing as data expressed by a digital signal.

FIG. 8 is a view showing an example of sound information (second information 304) acquired by the second acquisition unit 303. In the example shown in FIG. 8, in live performance image capturing, sound information up to the end timing of cut ID (1) is collected by the microphone 106. The example shown in FIG. 8 shows sound information acquired in pattern 1 to be described later. Here, a section corresponding to each cut ID and sound at the end of each section are defined in advance at the time of rehearsal image capturing. In step S701, the second acquisition unit 303 recognizes the sound at the end of each section, thereby acquiring sound information of each section.

In step S702, the decision unit 305 calculates the change rate of tempo between the rehearsal and live performance based on the first information 302 and the second information 304. Here, for example, the decision unit 305 compares the tempo in rehearsal image capturing and the actual tempo in live performance image capturing, thereby calculating the change rate of tempo between the rehearsal and the live performance. Hereinafter, a simple term "change rate of tempo" indicates the change rate of tempo between the rehearsal and the live performance in the same cut. Here, the decision unit 305 compares data expressed by a digital signal of sound between the sound information in rehearsal image capturing and the sound information in live performance image capturing and performs alignment of the same sound, thereby calculating the change rate of tempo.

In step S703, the decision unit 305 decides the camera work based on the change rate of tempo calculated in step S702. Here, the decision unit 305 corrects the camera work in rehearsal image capturing based on the calculated change rate (ratio) of tempo, thereby deciding the camera work in live performance image capturing. Here, of the sound information in live performance image capturing, as for the camera work in a section where alignment with the sound information in rehearsal image capturing is impossible (a section that cannot be associated with that in rehearsal image capturing), it is decided to cause the camera to execute fixed tracking or fixed control contents. In addition, the switching timing of the cut is calculated by aligning sound in live performance image capturing with the cut switching sound at the time of rehearsal. For example, the decision unit 305 corrects the camera work of cut ID (i+1) in rehearsal image capturing based on the change rate of tempo in cut ID (i), thereby deciding the camera work in live performance image capturing. Here, a certain cut is expressed as cut ID (i), and a cut time-serially following the cut is expressed as cut ID (i+1) (here, i=1, 2, 3 . . . ) In some cases, cut ID (i+1) will be expressed as a current cut, and cut ID (i) will be expressed as a preceding cut hereinafter.

In step S704, the communication unit 308 issues a control instruction to the camera control unit 226 of the camera of the camera ID corresponding to the cut ID via the communication units 213 and 223 such that control based on the camera work decided in step S703 is performed.

In step S705, the decision unit 305 determines whether to continue the processing. To continue the processing, the process returns to step S701. Otherwise, the processing shown in FIG. 7 is ended. Here, the processing may be ended if, for example, an ending operation is performed by the user or if, for example, steps S701 to S704 are executed a predetermined number of time or for a predetermined time. Also, for example, sound information may be transmitted from the microphone 106 to the information processing device 100 for each cut (at the end timing of each cut) in live performance image capturing, and one loop of steps S701 to S704 may be started in accordance with acquisition of the data.

Concerning the processing shown in FIG. 7, two assumed patterns, that is, pattern 1 and pattern 2 will be described below.

[Pattern 1: Case Where Processing is Executed at Switching Timing of Cut]

Pattern 1 is a case where the second acquisition unit 303 acquires sound information of one cut (up to the timing of switching to the cut of the next cut ID) in step S701. That is, here, sound information of such one cut section is acquired using a cut that is a section set in advance in rehearsal image capturing and live performance image capturing. In pattern 1, sound information up to the end timing of cut ID (i) (the timing of switching to cut ID (i+1)) is acquired.

In the example shown in FIG. 8, sound information in live performance image capturing up to the end timing of cut ID (1) is acquired, and data is recorded up to the column of cut ID (1). The actual tempo (BPM) is a tempo calculated in the time of the cut. The actual tempo may be calculated, for example, based on the numerical value of the tempo in rehearsal image capturing using the ratio of time necessary for executing the same sound in live performance image capturing. Like sound data recorded in FIG. 6, the sound data is data that expresses a time-series change of the loudness and pitch of sound by a digital signal. Such data is acquired as the second sound information 304 in step S701 of pattern 1.

In step S702 of pattern 1, the decision unit 305 compares the tempo in rehearsal image capturing with the actual tempo in live performance image capturing, thereby calculating the change rate of tempo between the rehearsal and the live performance. An example in which the decision unit 305 decides the camera work in live performance image capturing in cut ID (2) by correcting the camera work in rehearsal image capturing in cut ID (2) based on the change rate of tempo in cut ID (1) will be described here.

The change rate of tempo in cut ID (i) can be calculated by actual tempo in cut ID (i)÷tempo in cut ID (i) at the time of rehearsal image capturing. For example, the change rate of tempo in cut ID (1) is 75÷50=1.5. This indicates that performance is performed at a tempo 1.5 times higher than in the rehearsal at the end timing of cut ID (1) of live performance.

In step S703, the decision unit 305 decides the camera work based on the change rate calculated in step S702. Here, the movement speed of PTZ in cut ID (2) at the time of rehearsal image capturing is multiplied by the change rate, thereby calculating the movement speed of PTZ in cut ID (2) at the time of live performance image capturing. By this processing, the movement speed of the camera in rehearsal image capturing can be changed to the speed according to the tempo in live performance. More specifically, following calculation is performed.

$$\text{Movement speed of cut ID } (i+1) \text{ in live performance image capturing} = \text{movement speed of cut ID } (i+1) \text{ in rehearsal image capturing} \times \text{change rate of tempo of cut ID } (i)$$

$$\text{Movement speed } (P) \text{ of cut ID (2) in live performance image capturing} = 4 \times 1.5 = 6$$

$$\text{Movement speed } (T) \text{ of cut ID (2) in live performance image capturing} = 2 \times 1.5 = 3$$

$$\text{Movement speed } (Z) \text{ of cut ID (2) in live performance image capturing} = -0.2 \times 1.5 = -0.3$$

In step S704, the communication unit 308 issues a control instruction to the camera control unit 226 of the camera of the camera ID corresponding to the cut ID via the communication units 213 and 223 such that control based on the camera work decided in step S703 is performed. Here, since this is the switching timing of the cut, the decision unit 305 instructs the camera ID to perform image capturing at the current timing to the video distribution unit 306.

In pattern 1, an example in which the section of cut ID (1) is used as the above-described first audio section and the section of cut ID (2) is used as the second audio section has been described. However, sections that are set as cuts in advance may be used as the first audio section and the second audio section, or a section corresponding to one set of processes of acquiring sound information may be used as the (first/second) cut. The division method is not particularly limited if a specific audio section is extracted, based on the digital signal of sound, in association with each of rehearsal image capturing and live performance image capturing. For example, if sound information up to halfway through the cut ID 1 section is acquired, a partial section in the whole section of the cut ID up to the time where the sound information is acquired in the section of the cut ID may be defined as the first audio section, and a partial section from the time of sound information acquisition to the end time of the section of the cut ID may be defined as the second audio section. An example in which sound information up to halfway through a cut is acquired will be described below with reference to pattern 2.

[Pattern 2: Case Where Processing is Executed Halfway Through Cut]

Pattern 2 is a case where the second acquisition unit 303 acquires sound information up to halfway through one cut in step S701. FIG. 9 is a view showing an example of the second information 304 acquired in pattern 2. Items included in the sound information shown in FIG. 9 are the same as in FIG. 8.

In the example shown in FIG. 9, sound information up to halfway through cut ID (2) (timing at which performance has been executed up to FG of FGA) is acquired. In pattern 2 as well, the change rate of tempo is calculated, and the following camera work is decided, as in pattern 1. Here, since the sound information up to halfway through the cut is acquired, the camera work of the remaining portion of the cut is decided based on the change rate in the range where the sound information is acquired. Here, a provisional value of the actual tempo in cut ID (2) (a provisional value up to the tone G) is calculated as 100. More specifically, assuming that 4 sec are taken to execute sound data of FG in the rehearsal, and 2 sec are taken to execute the same sound in live performance, since the BPM in cut ID (2) at the time of rehearsal image capturing is 50, the BPM in live performance is 50×4÷2=100. Note that the actual tempo is calculated here using the ratio. However, an arbitrary method of evaluating the audio tempo may be used, for example, the number of beats (the number of quarter notes) in one minute may be calculated using score data as well.

In the example of pattern 2 shown in FIG. 9, more specifically, following calculation is performed.

Movement speed (*P*) of (remaining) cut ID (2) in live performance image capturing=4×2=8

Movement speed (*T*) of (remaining) cut ID (2) in live performance image capturing=2×2=4

Movement speed (*Z*) of (remaining) cut ID (2) in live performance image capturing=−0.2×2=−0.4

According to this processing, the camera work in rehearsal image capturing, sound information in rehearsal image capturing, and sound information in live performance image capturing are acquired, and the camera work in live performance image capturing can be decided based on these. In particular, the change rate is calculated based on the sound information in rehearsal image capturing and the sound information in live performance image capturing, and the camera work in rehearsal image capturing is corrected based on the change rate, thereby deciding the camera work in live performance image capturing. It is therefore possible to more appropriately control the camera work based on the change in the live performance with respect to the rehearsal.

Note that the description has been made here assuming that the speed of PTZ control is used as the camera control contents (movement speed) included in the camera work, but the method is not particularly limited to this if the control quantities of the camera are used. For example, if image capturing is performed while moving (for example, sliding) a camera whose position can be moved, the same processing as described above may be performed concerning a movement speed calculated for the movement of the camera.

Second Embodiment

In the first embodiment, an example in which the camera work is decided based on the change rate of tempo using the tempo as sound information has been described. An information processing device 100 according to this embodiment decides the camera work in live performance image capturing using a sound volume as sound information. In particular, an example will be described in which the camera work in live performance image capturing is decided based on a change of the sound volume with respect to a reference sound volume caused by rise in the liveliness of the auditorium.

Figure 10:
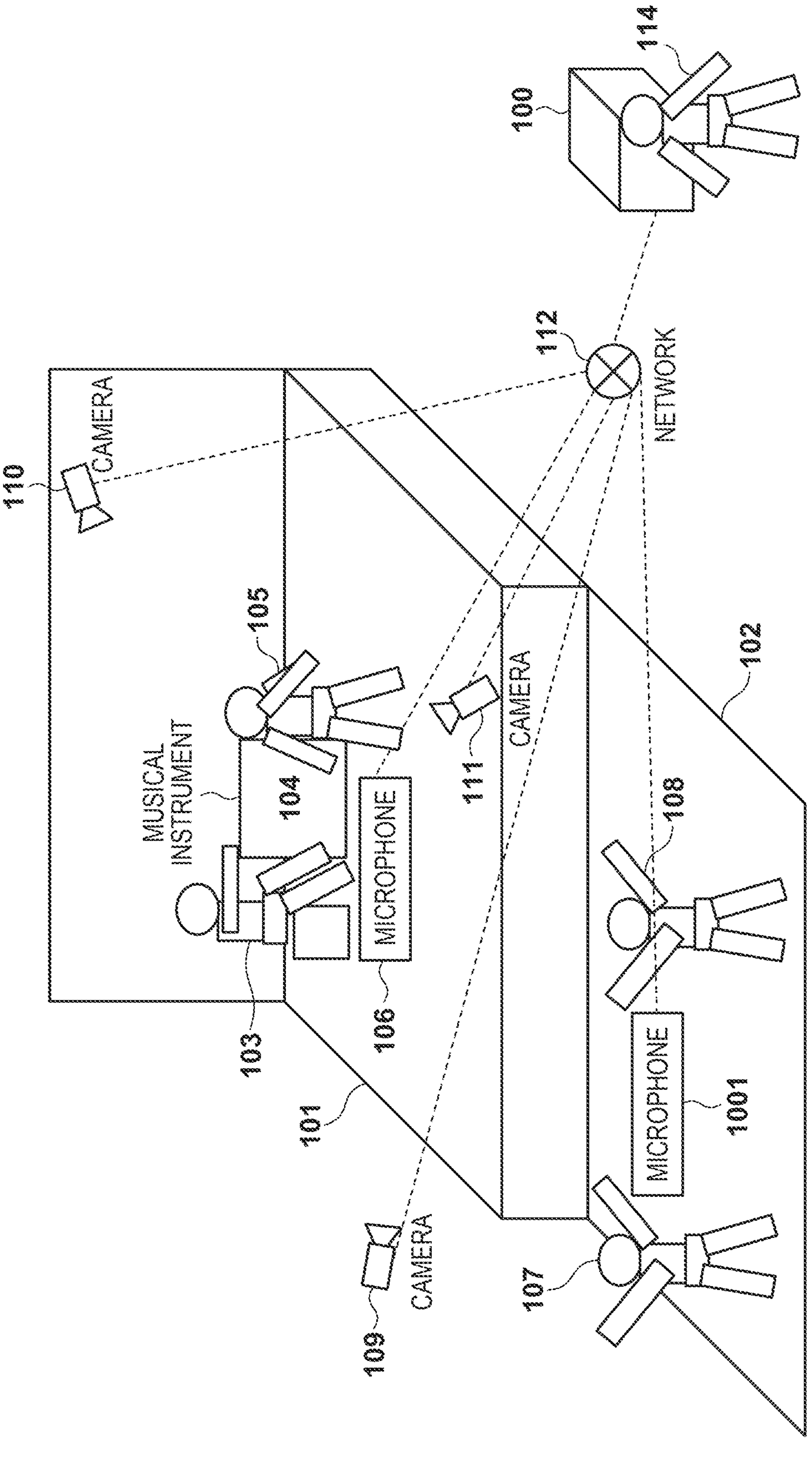
FIG. 10 is a schematic view of a system including an information processing device according to the second embodiment.

FIG. 10 is a schematic view showing the configuration of a control system according to the second embodiment. Constituent elements shown in FIG. 10 are the same as those shown in FIG. 1 except that a microphone 1001 is added. The microphone 1001 has the same configuration as a microphone 106, and can measure a sound volume.

Figure 11:
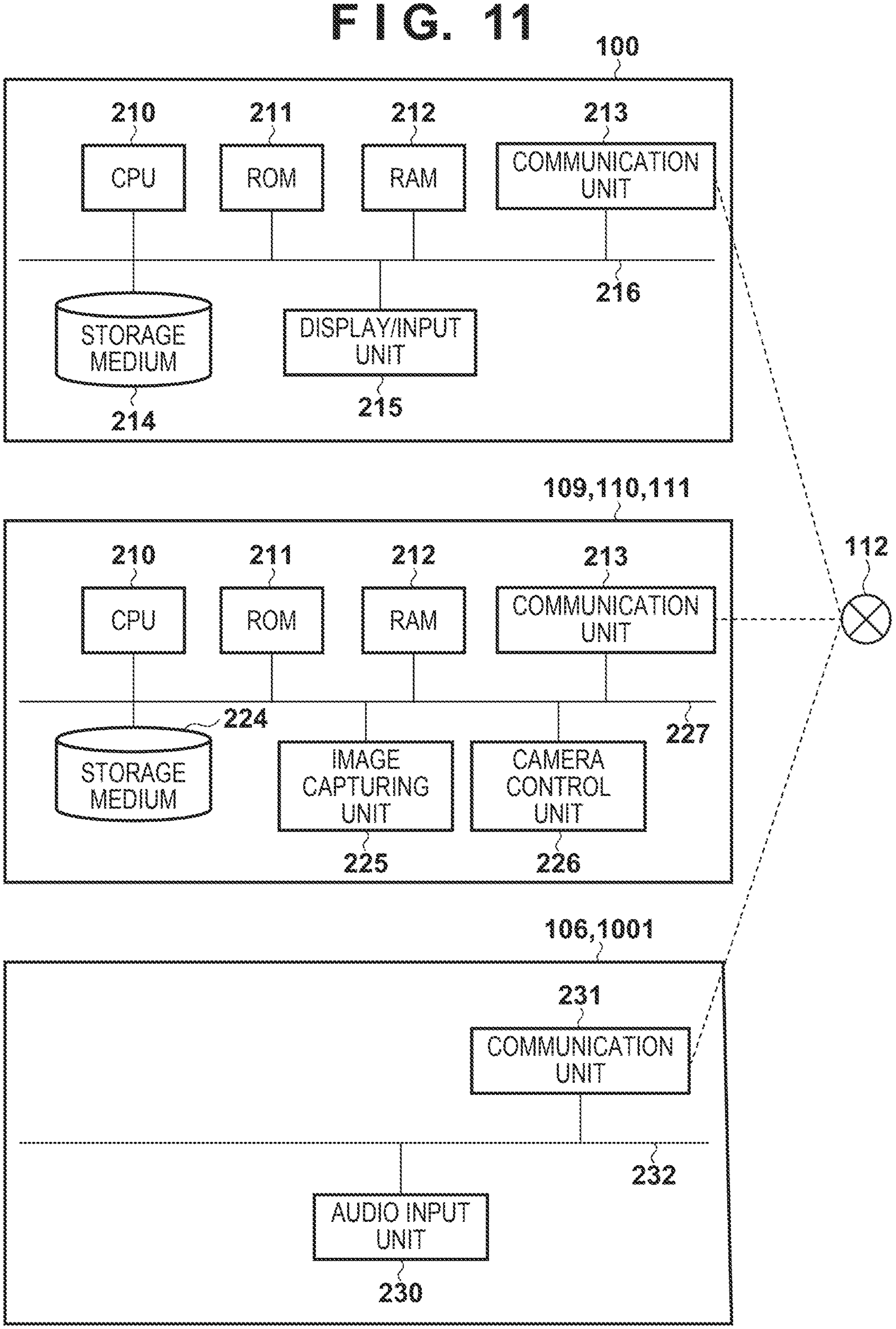
FIG. 11 is a block diagram showing an example of the hardware configurations of devices according to the second embodiment.
Figure 12:
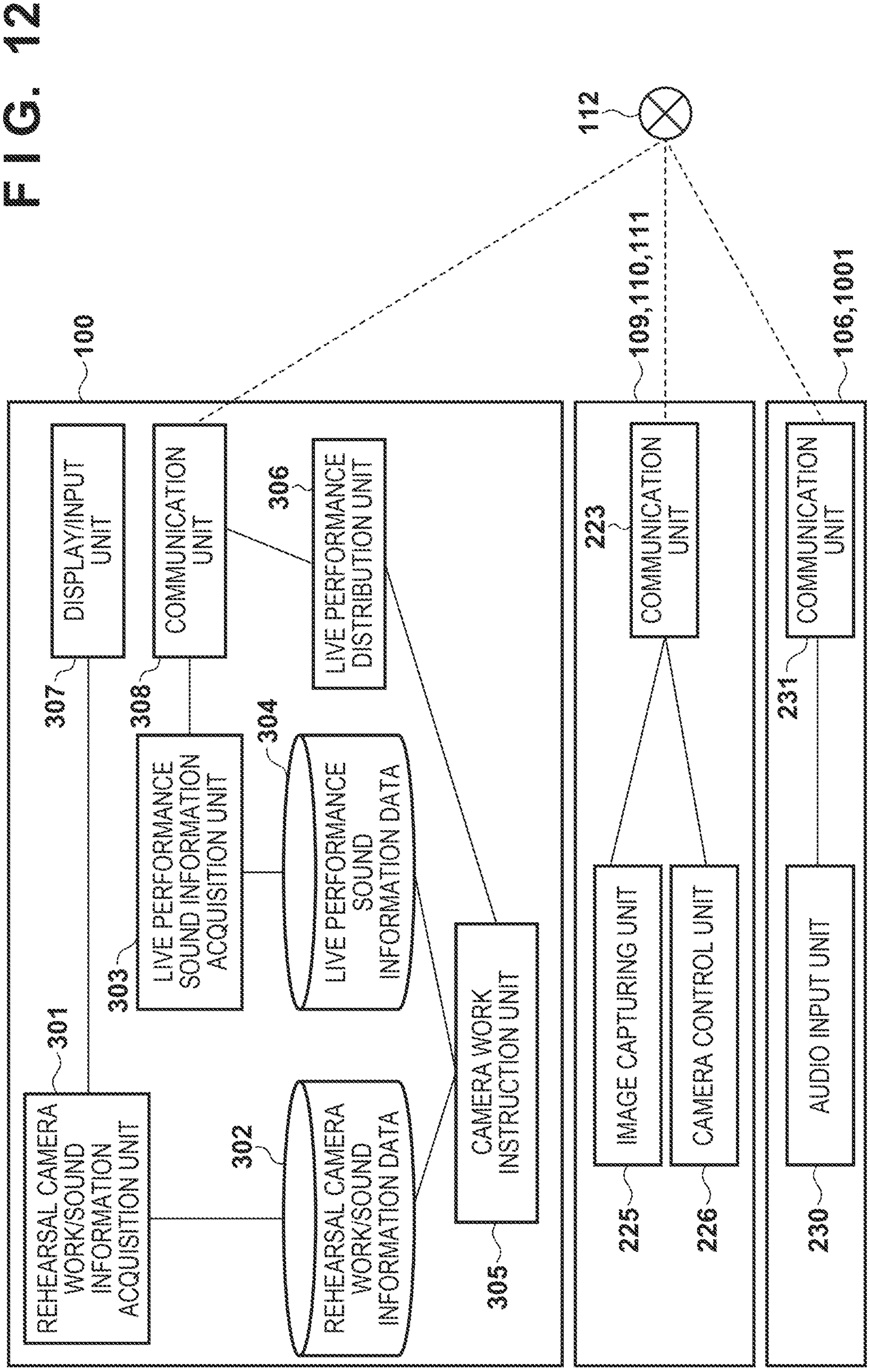
FIG. 12 is a block diagram showing an example of the functional configuration of the information processing device according to the second embodiment.

FIG. 11 is a block diagram showing an example of the hardware configurations of the information processing device 100, cameras 109, 110, and 111, and the microphone 106 according to this embodiment. FIG. 11 is the same as FIG. 2 except that the microphone 1001 having the same configuration as the microphone 106 is added. FIG. 12 is a block diagram showing an example of the functional configurations of the information processing device 100, the cameras 109, 110, and 111, and the microphones 106 and 1001, which form the control system, and logical connection between these. FIG. 12 is the same as FIG. 3 except that the microphone 1001 having the same configuration as the microphone 106 is added.

The information processing device 100 according to this embodiment has the same configuration as the information processing device 100 according to the first embodiment and can execute the same processing, and a repetitive description thereof will be omitted. The information processing device 100 according to this embodiment will be described below concerning the differences from the first embodiment.

In step S401, a first acquisition unit 301 according to this embodiment acquires camera work and sound information in rehearsal image capturing. Here, the camera work includes not only a start position and a movement speed shown in FIG. 6 but also the swing width of an operation of shaking the camera and a period of shaking in the operation. FIG. 13 is a view showing an example of first information 302 acquired in this embodiment, including the camera work. In FIG. 13, the shaking width (based on 50 dB) of the operation of periodically shaking the camera and the period (/sec) of shaking (in the operation) are recorded for each cut ID as information included in the camera work. Here, the shaking width (based on 50 dB) of the camera operation is the shaking width of shaking the camera when moving the camera. Here, 50 dB is set as the reference sound volume (the sound volume set in a rehearsal without audience). The shaking width can be set for each of PTZ control contents as, for example, Z: ±0.5.

The period of shaking the camera indicates how many times one shaking operation with the set shaking width is performed in one sec. For example, if the shaking width is set to Z: ±0.5 and the shaking period is set to 3 (/sec), shaking is executed three times in 1 sec such that Z changes as 0→0.5→0→-0.5→0 with respect to the current position.

Note that a description will be made here assuming that the reference sound volume is 50 dB and is common to all cuts. However, the reference sound volume may be changed for each cut. For example, the reference sound volume may be set for each cut based on a sound volume collected in each cut at the time of rehearsal image capturing.

Figure 14:
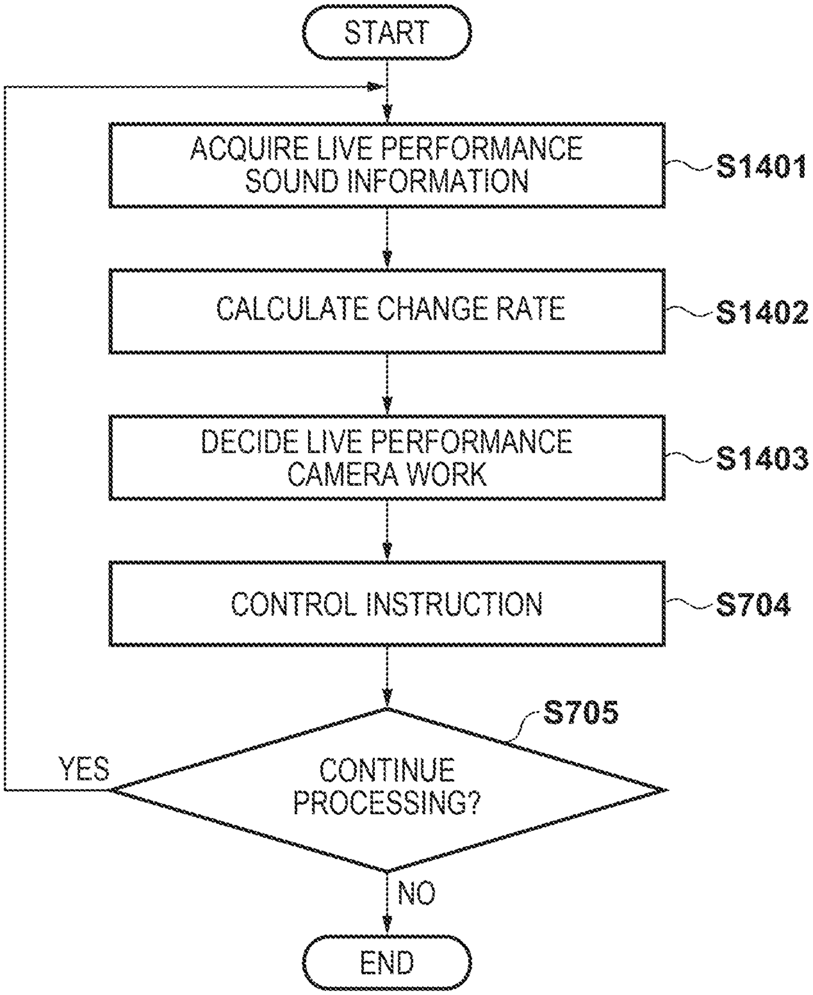
FIG. 14 is a flowchart showing an example of processing in live performance image capturing according to the second embodiment.

FIG. 14 is a flowchart showing an example of processing performed by the information processing device 100 according to this embodiment, which is performed in live performance image capturing after rehearsal image capturing. Processing shown in FIG. 14 is performed in the same manner as that shown in FIG. 7 except that steps S1401 to S1403 are performed in place of steps S701 to S703, and a repetitive description thereof will be omitted.

In step S1401, a second acquisition unit 303 acquires sound information (second information 304) in live performance image capturing. The second information 304 acquired here is the same as the information acquired in step S701 of the first embodiment except that it includes information indicating a sound volume in live performance image capturing.

In step S1402, a decision unit 305 calculates the change rate of tempo between the rehearsal and live performance and the change rate of sound volume in live performance with respect to the reference (this will sometimes simply be referred to as "change rate of sound volume" hereinafter) based on the first information 302 and the second information 304. The change rate of tempo is calculated as in step S702. Here, the change rate of sound volume in live performance with respect to the reference is calculated as the change rate of sound volume in live performance image capturing acquired in step S1401 with respect to the sound volume set as a reference in advance (here indicated as 50 dB in the first information 302). A detailed example of processing in step S1402 will be described later concerning pattern 1 and pattern 2.

In step S1403, the decision unit 305 decides the camera work based on the change rate of tempo and the change rate of sound volume in live performance from the reference, which are calculated in step S1402. Here, the movement speed of the camera in live performance image capturing based on the change rate of tempo is decided as in step S703. In addition, the decision unit 305 corrects the camera work in rehearsal image capturing based on the change rate of sound volume, thereby deciding the camera work in live performance image capturing. Here, the decision unit 305 corrects the swing width and shaking period of the camera operation in rehearsal image capturing based on the change rate of sound volume, thereby deciding the swing width and shaking period of the camera operation in live performance image capturing, which are included in the camera work. Next processes S704 and S705 are performed as in FIG. 7.

Concerning the processing shown in FIG. 14, two assumed patterns, that is, pattern 1 and pattern 2 will be described below.

[Pattern 1: Case Where Processing is Executed at Switching Timing of Cut]

Pattern 1 is the same case as pattern 1 according to the first embodiment. FIG. 15 is a view showing an example of sound information (second information 304) acquired by the second acquisition unit 303. In the example shown in FIG. 15, in live performance image capturing, sound information up to the end timing of cut ID (1) is collected by the microphone 106.

In step S1401 of pattern 1, a actual sound volume (cheering microphone) that is acquired via the microphone 1001 is acquired as information included in the second information 304. The actual sound volume is the volume of sound in the auditorium obtained by the microphone 1001. Note that the actual sound volume may be, for example, an average value or maximum value of sound volumes during the sound collection period, or another statistic value may arbitrarily be employed.

In step S1402 of pattern 1, the decision unit 305 calculates the change rate of sound volume in live performance with respect to the reference by comparing the reference sound volume with the actual sound volume acquired in step S1401. An example in which the decision unit 305 decides the camera work in live performance image capturing in cut ID (2) by correcting the camera work in rehearsal image capturing in cut ID (2) based on the change rate of sound volume in cut ID (1) will be described here.

The change rate of sound volume in cut ID (i) can be calculated by actual sound volume in cut ID (i)÷reference sound volume. For example, the change rate of sound volume in cut ID (1) is 75÷50=1.5. This indicates that performance is performed with a sound volume 1.5 times larger than the assumed reference sound volume at the end timing of cut ID (1) of live performance.

In step S1403, the decision unit 305 decides the camera work based on the change rates calculated in step S1402. Here, the shaking width and the period of shaking in the camera operation in cut ID (2) at the time of rehearsal image capturing is multiplied by the change rate of sound volume, thereby calculating the shaking width and the period of shaking in the camera operation in cut ID (2) at the time of live performance image capturing. By this processing, the shaking width and the period of shaking in the camera operation in rehearsal image capturing can be changed to the shaking width and the period of shaking according to the sound volume in live performance (that is, liveliness assumed from the sound volume of cheering, or the like). More specifically, following calculation is performed.

Shaking width in camera operation of cut ID $(i+1)$ in live performance image capturing=shaking width of cut ID $(i+1)$ in rehearsal image capturing×change rate of sound volume of cut ID $(i)$ Period of shaking in camera operation of cut ID $(i+1)$ in live performance image capturing=period of shaking of cut ID $(i+1)$ in rehearsal image capturing×change rate of sound volume of cut ID $(i)$ Detailed calculations using the values in FIGS. 13 and 15 are as follows.

Shaking width in camera operation of cut ID (2) in live performance image capturing=±0.5×1.5=±0.75

Period of shaking in camera operation of cut ID (2) in live performance image capturing=3×1.5=4.5

[Pattern 2: Case Where Processing is Executed Halfway Through Cut]

Pattern 2 is the same case as pattern 2 according to the first embodiment. FIG. 16 is a view showing an example of the second information 304 acquired in pattern 2. Items included in the sound information shown in FIG. 16 are the same as in FIG. 8.

In the example shown in FIG. 16, sound information up to halfway through cut ID (2) (timing at which performance has been executed up to FG of FGA) is acquired. In pattern 2 as well, the change rate of sound volume is calculated, and the following camera work is decided, as in pattern 1. Here, since the sound information up to halfway through the cut is acquired, the camera work of the remaining portion of the cut is decided based on the change rate in the range where the sound information is acquired. Here, a provisional value of the actual sound volume in cut ID (2) (a provisional value up to the tone G) is calculated as 100. The change rate of tempo is the same as in the example shown in FIG. 9. Here, since the reference sound volume in cut ID (2) at the time of rehearsal image capturing is 50 dB, and the sound volume up to the tone "G" in cut ID (2) at the time of live performance image capturing is 100 dB, it is considered that the sound volume is twice larger than assumed.

In the example of pattern 2 shown in FIG. 16, more specifically, following calculation is performed.

Shaking width in camera operation of (remaining) cut ID (2) in live performance image capturing=±0.5×2=±1.0

Period of shaking in camera operation of (remaining) cut ID (2) in live performance image capturing=3×2=6

According to this processing, the camera work in live performance image capturing can be decided based on the reference sound volume and the sound volume in live performance image capturing. In particular, the change rate between the reference sound volume and the sound volume in live performance image capturing is calculated, and the shaking width and the period of shaking of the camera in rehearsal image capturing are corrected based on the change rate, thereby deciding the camera work in live performance image capturing. It is therefore possible to estimate, based on the reference sound volume, how much the sound volume is increased by cheering or the like, that is, how much the rise of liveliness is and control the operation amount of the camera in accordance with the rise of liveliness.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-088272, filed May 30, 2024 which is hereby incorporated by reference herein in its entirety.

What is claimed is:

1. An information processing device comprising:

one or more memories storing instructions; and one or more processors executing the instructions to:

acquire first camera work that is camera work by a camera in rehearsal image capturing;

acquire first sound information that is sound information in a first audio section at a time of the rehearsal image capturing;

acquire second sound information that is sound information in a first audio section at a time of live performance image capturing with respect to the rehearsal image capturing;

determine second camera work that is camera work of the camera in the live performance image capturing based on the first camera work, the first sound information, and the second sound information; and instruct a control instruction to control the camera by the determined second camera work to a device that controls the camera, wherein the second camera work in the second audio section at the time of the live performance image capturing is determined by correcting the first camera work in a second audio section time-serially following the first audio section in the rehearsal image capturing based on the first sound information and the second sound information.

2. The device according to claim 1, wherein the one or more processors further execute the instructions to calculate a change rate of tempo indicated by the second sound information with respect to a tempo indicated by the first sound information, wherein the second camera work is determined by correcting the first camera work based on the calculated change rate.

3. The device according to claim 1, wherein the second camera work includes pan/tilt/zoom control contents of the camera that performs image capturing.

4. The device according to claim 1, wherein each of the first audio section and the second audio section is a section set in advance in the rehearsal image capturing.

5. The device according to claim 1, wherein sound information up to a tone at an end of the first audio section that is set in advance in the rehearsal image capturing is acquired as the first sound information.

6. The device according to claim 1, wherein each of the first audio section and the second audio section is a partial section of a section set in advance in the rehearsal image capturing.

7. The device according to claim 1, wherein the first audio section and the second audio section are sections extracted based on a digital signal of sound in association in the rehearsal image capturing and in the live performance image capturing.

8. The device according to claim 1, wherein, of sections during the live performance image capturing, in a section where association is impossible based on a digital signal of sound between the rehearsal image capturing and the live performance image capturing, the second camera work is determined such that the camera is caused to perform fixed tracking or the camera is caused to perform fixed control.

9. An information processing device comprising:

one or more memories storing instructions; and one or more processors executing the instructions to:

acquire first camera work that is camera work by a camera in rehearsal image capturing;

acquire first sound information that is sound information in the rehearsal image capturing;

acquire second sound information that is sound information in live performance image capturing with respect to the rehearsal image capturing;

determine second camera work that is camera work of the camera in the live performance image capturing based on the first camera work, the first sound information, and the second sound information; and instruct a control instruction to control the camera by the determined second camera work to a device that controls the camera, wherein the first camera work includes information of the shaking width and the period of shaking in the operation of periodically shaking the camera in the rehearsal image capturing, the second camera work includes a shaking width and a period of shaking in an operation of periodically shaking the camera in the live performance image capturing, the second sound information includes a sound volume in the live performance image capturing, wherein the one or more processors further execute the instructions to:

set a reference sound volume; and calculate a change rate of the sound volume in the live performance image capturing with respect to the reference sound volume, and the shaking width and the period of shaking in the operation of periodically shaking the camera in the live performance image capturing, which are included in the second camera work are determined by correcting the shaking width and the period of shaking based on the calculated change rate.

10. The device according to claim 9, wherein the sound volume in the live performance image capturing is the sound volume of cheering.

11. An information processing method comprising:

acquiring first camera work that is camera work by a camera in rehearsal image capturing;

acquiring first sound information that is sound information in a first audio section at a time of the rehearsal image capturing;

acquiring second sound information that is sound information in a first audio section at a time of live performance image capturing with respect to the rehearsal image capturing;

determining second camera work that is camera work of the camera in the live performance image capturing based on the first camera work, the first sound information, and the second sound information; and instructing a control instruction to control the camera by the determined second camera work to a device that controls the camera, wherein the second camera work in the second audio section at the time of the live performance image capturing is determined by correcting the first camera work in a second audio section time-serially following the first audio section in the rehearsal image capturing based on the first sound information and the second sound information.

12. A non-transitory computer-readable storage medium configured to store a computer program comprising instructions for executing an information processing method, the method comprising:

acquiring first camera work that is camera work by a camera in rehearsal image capturing;

acquiring first sound information that is sound information in a first audio section at a time of the rehearsal image capturing;

acquiring second sound information that is sound information in a first audio section at a time of live performance image capturing with respect to the rehearsal image capturing;

determining second camera work that is camera work of the camera in the live performance image capturing based on the first camera work, the first sound information, and the second sound information; and instructing a control instruction to control the camera by the determined second camera work to a device that controls the camera, wherein the second camera work in the second audio section at the time of the live performance image capturing is determined by correcting the first camera work in a second audio section time-serially following the first audio section in the rehearsal image capturing based on the first sound information and the second sound information.

* * * * *